United States Patent
Zhao

(10) Patent No.: US 12,532,333 B2
(45) Date of Patent: Jan. 20, 2026

(54) METHOD FOR SELECTING RESOURCE IN SIDELINK COMMUNICATION, ELECTRONIC DEVICE AND STORAGE MEDIUM

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 430 days.

(21) Appl. No.: 17/996,298

(22) PCT Filed: Apr. 17, 2020

(86) PCT No.: PCT/CN2020/085440
§ 371 (c)(1),
(2) Date: Oct. 14, 2022

(87) PCT Pub. No.: WO2021/208103
PCT Pub. Date: Oct. 21, 2021

(65) Prior Publication Data
US 2023/0217466 A1    Jul. 6, 2023

(51) Int. Cl.
*H04W 72/02* (2009.01)
*H04W 72/0446* (2023.01)
(Continued)

(52) U.S. Cl.
CPC ....... *H04W 72/40* (2023.01); *H04W 72/0446* (2013.01); *H04W 72/56* (2023.01); *H04W 74/0808* (2013.01); *H04W 4/40* (2018.02)

(58) Field of Classification Search
CPC .......... H04W 4/40; H04W 4/44; H04W 4/48; H04W 72/02; H04W 72/0446;
(Continued)

(56) References Cited

U.S. PATENT DOCUMENTS 12,069,712 B2 *  8/2024  Wang ................... H04W 52/38
12,081,475 B2 *  9/2024  Li ....................... H04W 28/0252
(Continued)

FOREIGN PATENT DOCUMENTS

CN    106686736 A    5/2017
CN    109247073 A    1/2019
(Continued)

OTHER PUBLICATIONS

Notice of Reasons for Refusal for Japanese Patent Application No. 2022-562876, issued Jul. 4, 2023, 6 pages.
(Continued)

*Primary Examiner* — Khawar Iqbal
(74) *Attorney, Agent, or Firm* — Finnegan, Henderson, Farabow, Garrett & Dunner, L.L.P.

(57) ABSTRACT

A method and apparatus for resource selection during direct communication, an electronic device and a storage medium, which relate to the technical field of communications. The method may comprise: according to a time unit set corresponding to resources used for direct communication, determining at least one first time unit that satisfies a monitoring condition, the time unit set comprising one or more first time units; and according to the resources corresponding to the first time unit that satisfies the monitoring condition, determining a resource used for transmitting data to be sent. On the basis of the described method, the requirements for wireless communication can be better met.

14 Claims, 3 Drawing Sheets determining at least one first time unit that satisfies a sensing condition according to a set of time units corresponding to resources for the sidelink communication; wherein the set of time units comprises one or a plurality of first time units — S110 determining a resource for transmitting data to be transmitted according to a resource corresponding to the at least one first time unit that satisfies the sensing condition — S120

(51) Int. Cl.
 *H04W 72/40* (2023.01)
 *H04W 72/56* (2023.01)
 *H04W 74/08* (2024.01)
 *H04W 74/0808* (2024.01)
 *H04W 4/40* (2018.01)

(58) Field of Classification Search
 CPC ... H04W 72/40; H04W 72/53; H04W 72/535; H04W 76/14; H04W 72/569; H04W 72/56; H04W 74/0808
 See application file for complete search history.

(56) References Cited

U.S. PATENT DOCUMENTS

| | | | |
|---|---|---|---|
| 2017/0188391 A1* | 6/2017 | Rajagopal | H04W 74/0816 |
| 2019/0132818 A1 | 5/2019 | Yasukawa et al. | |
| 2019/0208504 A1 | 7/2019 | Yasukawa et al. | |
| 2021/0227604 A1* | 7/2021 | Huang | H04W 40/248 |
| 2021/0377963 A1* | 12/2021 | Wang | H04W 52/383 |
| 2022/0086807 A1* | 3/2022 | Dong | H04W 72/20 |
| 2022/0159588 A1* | 5/2022 | Wang | H04W 52/14 |
| 2022/0386284 A1* | 12/2022 | Zhao | H04W 72/02 |
| 2023/0050353 A1* | 2/2023 | Miao | H04W 74/0808 |
| 2023/0345559 A1* | 10/2023 | Li | H04W 76/23 |
| 2024/0323928 A1* | 9/2024 | Wu | H04W 72/542 |
| 2024/0365095 A1* | 10/2024 | Lee | H04W 74/002 |

FOREIGN PATENT DOCUMENTS

| | | |
|---|---|---|
| WO | WO 2017116108 A1 | 7/2017 |
| WO | WO 2017179286 A1 | 10/2017 |

OTHER PUBLICATIONS

Patent Office of the Russian Federation, Russian Office Action issued in Application No. 2022128613/07, Mar. 31, 2023, 14 pages.
European Patent Office, Extended European Search Report issued in Application No. 20931570.4, Mar. 24, 2023, 8 pages.
International Search Report and Written Opinion of International Application No. PCT/CN2020/085440, mailed Jan. 19, 2021, 17 pages.
NTT Docomo, Inc., "Details of resource selection using partial sensing by pedestrian UE", 3GPP TSG RAN WG1 Meeting #87, R1-1612687, Reno, USA, Nov. 14-18, 2016, 7 pages.
TCL Communication, "Resource allocation for NR sidelink—Mode 2", 3GPP TSG RAN WG1 Meeting #99, R1-1912241, Reno, US, Nov. 18-22, 2019, 6 pages.
Intel Corporation, Resource Allocation Mode-2 for NR V2X Sidelink Communication, 3GPP TSG RAN WG1 Meeting #98bis, R1-1910650, Chongqing, China, Oct. 14-20, 2019, 28 pages.
CATT, Discussion on latency reduction between packet arrival and resource selection, 3GPP TSG RAN WG1 Meeting #92bis, R1-1803728, Sanya, China, Apr. 16-20, 2018, 3 pages.
Request for the Submission of an Opinion for Korean Application No. 10-2022-7040130, dated Mar. 12, 2025, 18 pages.

* cited by examiner

METHOD FOR SELECTING RESOURCE IN SIDELINK COMMUNICATION, ELECTRONIC DEVICE AND STORAGE MEDIUM

CROSS-REFERENCE TO RELATED APPLICATION

This application is the national phase of International Application No. PCT/CN2020/085440 filed on Apr. 17, 2020, the content of which is hereby incorporated by reference in its entirety.

TECHNICAL FIELD

The disclosure relates to the field of communication technologies, and in particular to a method for selecting a resource in a sidelink communication, an electronic device, and a storage medium.

BACKGROUND

The continuous emergence of a new generation of new Internet applications puts forward higher requirements for wireless communication technologies, driving the continuous evolution of wireless communication technologies to satisfy application requirements.

Vehicle-to-everything (V2x) communication is an important technical means to realize vehicle-road collaboration and solve road traffic safety problems. V2x includes vehicle-to-vehicle (V2V) communication, vehicle-to-infrastructure (V2I) communication, and vehicle-to-pedestrian (V2P) communication. By supporting V2V. V2I, and V2P. V2x can effectively improve traffic safety, improve traffic efficiency, and enrich people's travel experience. Using existing cellular communication technologies to support V2x communication can effectively utilize existing base station deployments, reduce device overhead, and provide services with quality of service (QOS) guarantees, to satisfy requirements of V2x services. Therefore, in long term evolution release 14/15 (LTE Rel-14/15), it provides that the cellular network supports the V2x communication, namely cellular based V2x (C-V2x).

In C-V2x, communication between a vehicle-mounted device and other devices can be transferred through a base station and a core network, that is, a communication link between a terminal device and the base station in the original cellular network is used for uplink/downlink (UL/DL) communication, and sidelink (SL) communication can also be performed directly through a sidelink link between devices. Compared with Uu interface communication (an interface between the user equipment (UE) and a wireless access network), the sidelink communication has characteristics of short delay and low overhead, which is very suitable for sidelink communication between a vehicle-mounted device and other peripheral devices that are close to a geographical position of the vehicle-mounted device.

With the development of a new generation of fifth-generation (5G) mobile communication technology, 5G new radio (NR) technology is used in the third-generation partnership project (3GPP) Rel-16 to support new V2x communication services and scenarios, such as vehicles platooning, extended sensors, advanced driving, and remote driving. In general, 5G V2x sidelink can provide the higher communication rate, shorter communication delay, and more reliable communication quality.

SUMMARY

According to a first aspect, the disclosure provides a method for selecting a resource in a sidelink communication, including: determining at least one first time unit that satisfies a sensing condition according to a set of time units corresponding to resources for the sidelink communication; in which the set of time units includes one or a plurality of first time units; and determining a resource for transmitting data to be transmitted according to a resource corresponding to the at least one first time unit that satisfies the sensing condition.

According to a second aspect, the disclosure provides a method for selecting a resource in a sidelink communication, including: determining at least one time unit corresponding to a candidate resource according to a sensing mode; and determining a resource for transmitting data to be transmitted according to a resource corresponding to the at least one time unit.

According to a third aspect, the disclosure provides an electronic device including a memory and a processor; in which the memory is configured to store a computer program, and the processor is configured to perform the method for selecting a resource provided in the first aspect or the second aspect of the disclosure when executing the computer program.

According to a fourth aspect, the disclosure provides a computer-readable storage medium in which a computer program is stored. The computer program is configured to perform the method for selecting a resource provided in the first aspect or the second aspect of the disclosure when the computer program is executed by a processor.

BRIEF DESCRIPTION OF THE DRAWINGS

In order to describe the technical solutions more clearly in embodiments of the disclosure, the following will briefly introduce the accompanying drawings that need to be used in the description of embodiments of the disclosure.

DETAILED DESCRIPTION

Figure 1:
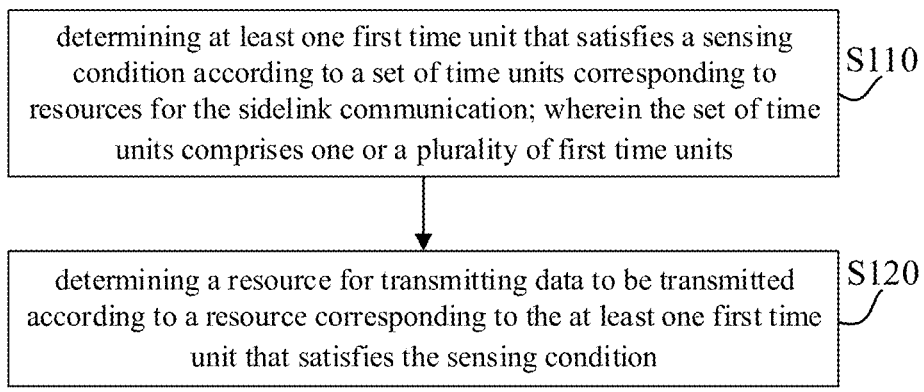
FIG. 1 illustrates a flowchart of a method for selecting a resource in a sidelink communication, according to an optional embodiment of the disclosure.

Reference will now be made in detail to embodiments of the disclosure, examples of which are illustrated in the accompanying drawings. The same or similar elements and elements having the same or similar functions are denoted by like reference numerals throughout the descriptions. The embodiments described herein with reference to the accompanying drawings are explanatory, illustrative, and used to explain the disclosure. The embodiments shall not be construed to limit the disclosure.

Those skilled in the art can understand that, the singular forms "a," "an." "said," and "the" described herein are intended to include the plural forms as well, unless the context clearly indicates otherwise. It should be further understood that the terms "comprise," "include," and the like used in the description of embodiments of the disclosure refers to the presence of features, integers, steps, operations, elements and/or components, but do not exclude the presence or addition of one or more other features, integers, steps, operations, elements, components, and/or a combination thereof. It should be understood that, when it refers to an element as being "connected" or "coupled" to another element, it can be directly connected or coupled to the other element or intervening elements may also be present. In addition, "connected" or "coupled" used herein may include wireless connection or wireless coupling. The term "and/or" as used herein includes all or any one and all combinations of one or more of associated listed items.

Unless otherwise defined, all terms (including technical terms and scientific terms) used herein have the same meanings as commonly understood by those skilled in the art to which this disclosure belongs. "A user equipment (UE)", "a terminal", or "a terminal device" as used herein may include a wireless signal receiver equipment, which does not have a wireless transmitting capability, and may also include a hardware equipment of receiving and transmitting, which is a hardware equipment capable of receiving and transmitting for two-way communication on a two-way communication link. Such equipment may include: a cellular or other communication equipment, which has a single line display or multi-line display or does not have the multi-line display: a personal communication service (PCS), which can combine voice and data processing, fax and/or data communication capabilities: a personal digital assistant (PDA), which may include a radio frequency receiver, a pager, Internet/Intranet access, a web browser, a notepad, a calendar and/or a global positioning system (GPS) receiver; a conventional laptop and/or palmtop computer or other device that has and/or includes a radio frequency receiver: or the like. The "terminal", "terminal device", and "user equipment" used herein can be portable, transportable, installed in vehicles (aviation, sea and/or land), or suitable and/or configured to locally operate, and/or operate in any other location on the earth and/or space in a distributed form. The "terminal". "terminal device", and "user equipment" used herein can also be communication terminals, internet terminals, music/video playback terminals, such as PDA, mobile Internet device (MID) and/or mobile phone with music/video playback functions, a smart TV, a set-top box.

In LTE V2x sidelink communication, a user (that is, a sidelink communication device, also referred to as a user equipment) is supported to independently select time and frequency resources (referred to as time-frequency resources) to transmit sidelink data. When the user uses a resource autonomous selection mode, a resource selection manner using resource reservation and based on channel sensing is adopted. Each user equipment periodically reserves transmission resources for the next transmission during the current transmission. Compared with the time-frequency resource used for the current transmission, the reserved resources are separated by a specified period in time and occupy the same size and position in frequency. Each user equipment needs to constantly sense the reservation information transmitted by other user equipment on the channel, and predict future interference on the time-frequency resources based on the reservation information and the corresponding channel measurement results. The user equipment will try to select the time-frequency resource with less interference for data transmission.

Continuous channel sensing for the user equipment may consume a lot of power. Therefore. "partial sensing" is introduced into LTE V2x (mainly to help handheld terminals) to achieve power saving effects. Since a period value of resource reservation in LTE V2x belongs to a limited set (for example, a set of {100, 200, . . . , 1000} ms), for the time-frequency resource on a given time unit, reserved time positions at which the transmission of the time-frequency resource occurs also belong to a limited set (for example, a set of time units {100, 200, 300, . . . , 1000} ms before this time unit). Therefore, given a duration of time positions (for example, K time units), the user equipment can only sense the sidelink transmission in the previous part of the time units, for example, only sense K time units of {100, 200, . . . 1000} ms before K time units, it is possible not to omit all the time-frequency resource reservations at this duration of time positions.

In LTE V2x, the protocol allows the user equipment to select resources only on a limited time set, and ensures to sense all time positions that may be reserved for time-frequency resources on this time set. For other time positions, the user equipment can enter an energy-saving state. A minimum value of the number of time units in the limited time set for resource selection by the user equipment can be restricted through base station configuration or pre-configuration, to prevent the time set from being too small and there is no suitable resource to select.

In 5G V2x, unlike LTE V2x, 5G V2x supports aperiodic resource reservation. Each current transmission can reserve at most one or two (determined by configuration or pre-configuration) time-frequency resources of the same size at any position within the future W (logical) time units. 5G V2x also supports periodic resource reservation, which can be enabled and disabled through configuration or pre-configuration. At present, W is a fixed value in the communication protocol, which is 32 logical slots.

In the upcoming Rel-17 sidelink optimization discussion, it will be discussed how to extend the sidelink to other applications including commercial and public safety based on the design of Rel-16 5G V2x. In these applications, as well as in V2P applications of V2x, power saving is a very important requirement. Especially for handheld terminals and other devices, power saving is a particularly important aspect to be considered.

From the foregoing description, unlike LTE V2x, 5G V2X not only supports periodic resource reservation, but also supports aperiodic resource reservation. For aperiodic resource reservation, in order to satisfy "partial sensing", that is, to sense time positions of resource transmission on all possible reserved time units, a new user equipment behavior needs to be defined. In addition, how the user equipment saves power in the case of aperiodic resource reservation is also an important issue that needs to be considered, especially for sidelink communication devices such as handheld terminals. Of course, solutions provided by embodiments of the disclosure are also applicable to any other user equipment that needs to perform the sidelink communication.

In order to better satisfy communication requirements, embodiments of the disclosure provide a method for selecting a resource in a sidelink communication. Based on this method, the power consumption of the sidelink communication device can be effectively reduced, and the purpose of energy saving of the device can be achieved.

In order to better understand the solutions provided by embodiments of the disclosure, the following first describes related terms and related technologies involved in the disclosure.

A time unit: the time unit described in embodiments of the disclosure may refer to either a logical time unit or a physical time unit. Logical time units refer to only time units that may be used by the SL communication; and physical time units refer to all time units, including both time units that may be used by the SL communication and time units that may not be used by the SL communication (such as time units configured for downlink transmission, or time units occupied by other purposes). A unit of the time unit is not limited in embodiments of the disclosure. For example, it can be a frame, subframe, slot, symbol, etc., or it can be an absolute time unit, such as 1ms (milliseconds), 1 μs (microsecond). In the description of the following embodiments, in order to better illustrate the solutions provided by the disclosure, in some examples, the unit of the time unit will be described by taking a slot as an example.

A position of a time unit: a position of a time unit in a time domain. For example, a time unit is the $n^{th}$ time unit, the position of this time unit can be understood as the $n^{th}$, and the first time unit after this time unit is the (n+1)th time unit. In practical applications, based on different units used by time units, positions of time units can also have the meaning corresponding to the actual units used, that is, the description of the position of the time unit can be converted into a relation description corresponding to the unit of the time unit. For example, if the unit of the time unit is a slot, the position of the time unit can be represented by which slot; for another example, if the unit of the time unit is an absolute time unit, such as ms (milliseconds), how many milliseconds can be used to characterize the position of the time unit.

A user equipment sensing a time unit: which refers to a behavior of detecting and receiving, by the user equipment, a specific sidelink communication channel or sidelink signal within the time unit, and/or measuring, by the user equipment, based on detection and reception results. For example, for NR V2x sidelink communication, the user equipment senses within a time unit, which may include the NR V2x user equipment blindly detecting a physical sidelink control channel (PSCCH) and performing signal strength corresponding measuring.

In order to make objectives, technical solutions, and advantages of the disclosure clearer, the following will describe in detail how various optional implementations of the disclosure and the technical solutions of embodiments of the disclosure solve the above technical problems with reference to specific embodiments and drawings. The following specific embodiments can be combined with each other, and the same or similar concepts or processes may not be repeated in some embodiments. The embodiments of the disclosure will be described below in conjunction with the accompanying drawings.

FIG. 1 illustrates a flowchart of a method for selecting a resource in a sidelink communication, according to some embodiments of the disclosure. The method may be executed by a sidelink communication device, and specifically executed by a user equipment at a transmitting end, such as a mobile terminal (for example a user phone) in the sidelink communication. The method can be applied to fields including but not limited to public safety, commercial usage or the like. As illustrated in FIG. 1, the method may include the following.

In step S110, at least one first time unit that satisfies a sensing condition is determined according to a set of time units corresponding to resources for the sidelink communication; in which the set of time units includes one or a plurality of first time units.

In step S120, a resource for transmitting data to be transmitted is determined according to a resource corresponding to the at least one first time unit that satisfies the sensing condition.

It should be noted that "plurality," "multiple." or the like described in embodiments of the disclosure includes two or more. The resource selection in embodiments of the disclosure includes resource primary selection or resource reselection, that is, the data to be transmitted may be initial transmission data or retransmission data. The form of "resource" in embodiments of the disclosure is not limited, which may refer to one or more of time domain resource, frequency domain resource, code domain resource, or the like.

For the user equipment at the transmitting end, the resources used for the sidelink communication may refer to the resources allocated to the user equipment for the sidelink communication, or refer to the resources corresponding to the time units after a moment of selecting a resource in the resources allocated to the user equipment for the sidelink communication. It can be understood that the at least one first time unit that satisfies the sensing condition is one or a plurality of first time units that satisfies the sensing condition in the set of time units. The at least one first time unit that satisfies the sensing condition may be one first time unit or a plurality of first time units in the set of time units.

The sensing condition is a condition for determining a time unit corresponding to a candidate resource that can be used to transmit the data to be transmitted. The sensing condition is a condition for determining a resource corresponding to which time unit or time units, which can be used as the candidate resource for transmitting the data to be transmitted, when the user equipment at the transmitting end needs to select a resource, and the user equipment can determine according to the sensing condition the at least one first time unit corresponding to the candidate resource as the candidate resource for transmitting the data to be transmitted.

It should be noted that the name of the sensing condition is a schematic name, and other names can also be substituted, which is not limited in embodiment of the disclosure.

In the method for selecting a resource in a sidelink communication, provided by embodiment of the disclosure, the user equipment can quickly determine the at least one first time unit according to the sensing condition before transmitting the sidelink communication data, so that a resource is selected from the resource corresponding to the first time unit that satisfies the sensing condition. Based on this method, even if other user equipment has made aperiodic resource reservations, the user equipment at the transmitting end can conveniently and quickly select the resource that it can use for data transmission according to the sensing condition. Compared with the related art, it will not increase the energy consumption of the equipment and better satisfy the communication needs.

In some embodiments of the disclosure, there may be one or a plurality of first time units that satisfy the sensing condition, and there may be one or more resources corresponding to the first time unit that satisfies the sensing condition. One or more resources can be determined from these resources for transmitting the data to be transmitted.

In an optional embodiment of the disclosure, before determining the at least one first time unit that satisfies the sensing condition, the method further include: determining the sensing condition.

In practical applications, time units at different time positions can correspond to the same or different sensing conditions. That is, the sensing conditions may include a variety of different configuration manners. Accordingly, before determining the at least one first time unit that satisfies the sensing condition according to the above-mentioned set of time units, the above-mentioned sensing condition may be determined first, and then according to the sensing condition, the at least one first time unit that satisfies the sensing condition is determined from the set of time units.

It should be noted that, in practical applications, when the set of time units includes a plurality of first time units, the above-mentioned sensing condition may be for one first time unit in the set of time units, or for a plurality of first time units in the set of time units. That is, the sensing condition and the first time unit can be one-to-one or one-to-many. For example, the sensing condition can correspond to all the first time units, that is, the sensing condition corresponds to the set of time units including one or a plurality of first time units. The configuration manner is not limited in embodiments of the disclosure.

In an optional embodiment of the disclosure, the method further includes: determining the sensing condition according to a time interval between the at least one first time unit and a moment of selecting a resource.

In other words, the sensing condition may have a corresponding relationship with the above-mentioned time interval.

It should be noted that a time granularity corresponding to the "moment" of selecting a resource and a time granularity of the time unit may be the same or different. As an example, assuming that a time unit is a slot, the moment of selecting a resource may refer to a slot for selecting a resource or a symbol for selecting a resource. For the convenience of description, in some examples below, the moment of selecting a resource will be described by taking the time unit of selecting a resource as an example.

In an optional embodiment of the disclosure, the method further includes: in response to a time interval between the at least one first time unit and a moment of selecting a resource being greater than a first duration threshold or being equal to the first duration threshold, determining that the sensing condition includes a minimum set of time units for sensing before the moment being an empty set; and in response to the time interval between the at least one first time unit and the moment of selecting a resource being less than the first duration threshold or being equal to the first duration threshold, determining that the sensing condition includes sensing a time unit located before the moment for not less than a second duration threshold.

From the foregoing description, it can be seen that the sensing condition may be for one first time unit, or for the set of time units including one or a plurality of first time units.

When the sensing condition is for one time unit, specifically, for one time unit, if the time interval between this time unit and the moment of selecting a resource is greater than or equal to the first duration threshold, the user equipment may perform channel sensing or not perform channel sensing before selecting a resource. Regardless of whether sensing is performed or not, the resource on this time unit can be used as a candidate resource for the user equipment to transmit data. At this time, whether the user equipment is sensing, it can be determined by the user equipment itself, such as determining whether to sense based on the current status of the user equipment, for example the current power of the equipment, or the available storage space of the equipment, or whether the user equipment is sensing and how to sense, it can be determined according to the indication obtained from the base station. If the time interval between this time unit and the moment of selecting a resource is less than or equal to the first duration threshold, the user equipment can only perform channel sensing a time unit located before the moment of selecting a resource for not less than the second duration threshold, and the resource on this time unit can be used as the candidate resource for the user equipment to transmit data. Similarly, at this time, when the user equipment performs channel sensing a time unit for not less than the second duration threshold, the sensing time may be determined by the user equipment itself, or may be determined according to the indication obtained from the base station. In this manner, the second duration threshold corresponding to each first time unit may be the same or different. Optionally, if the second duration threshold corresponding to each first time unit is the same, after the earliest first time unit that satisfies the condition is determined according to the sensing condition, the first time unit located after this first time unit can be directly determined as the first time unit that satisfies the sensing condition.

When the sensing condition is for a set of time units, if the set includes a plurality of first time units, in the plurality of first time units, there may be a first time unit having a time interval with the moment of selecting a resource not less than the first duration=threshold, and a first time unit having a time interval with the moment of selecting a resource less than the first duration threshold. Thus, the sensing condition may include the minimum set of time units for sensing before the moment of selecting a resource is the empty set and also include sensing the time unit located before the moment for not less than the second duration threshold. That is, for the above-mentioned set of time units, the sensing condition is sensing the time unit located before the moment for not less than the second duration threshold, that is, an intersection of various sensing conditions. At this time, when the at least one first time unit that satisfies the sensing condition is determined from the set of time units, the first time unit that satisfies the sensing condition may be the first time unit that satisfies the above intersection.

It can be seen that based on this optional solution, the user equipment at the transmitting end may or may not perform channel sensing before selecting a resource, and the candidate resource corresponding to sensing and non-sensing may be different. If the user equipment does not perform sensing, the at least one first time unit that satisfies the sensing condition includes each time unit whose time interval from the moment of selecting a resource is greater than or equal to the first duration threshold. If the user equipment performs sensing, the at least one first time unit that satisfies the sensing condition includes each time unit whose time interval from the moment of selecting a resource is less than or equal to the first duration threshold.

The values of the first duration threshold and the second duration threshold are not limited in embodiments of the disclosure. If they can be pre-configured, they can be determined by the user equipment according to certain pre-configuration rules. As an optional solution, the value of the first duration threshold may be a maximum time interval that allows aperiodic resource reservation in the sidelink communication, such as the existing 32 slots.

In addition, it should be understood that the foregoing time interval should be shorter than the PDB of the data to be transmitted, that is, the resource corresponding to the at least one first time unit that satisfies the sensing condition should be a resource that satisfies a delay requirement of the data to be transmitted.

Figure 4:
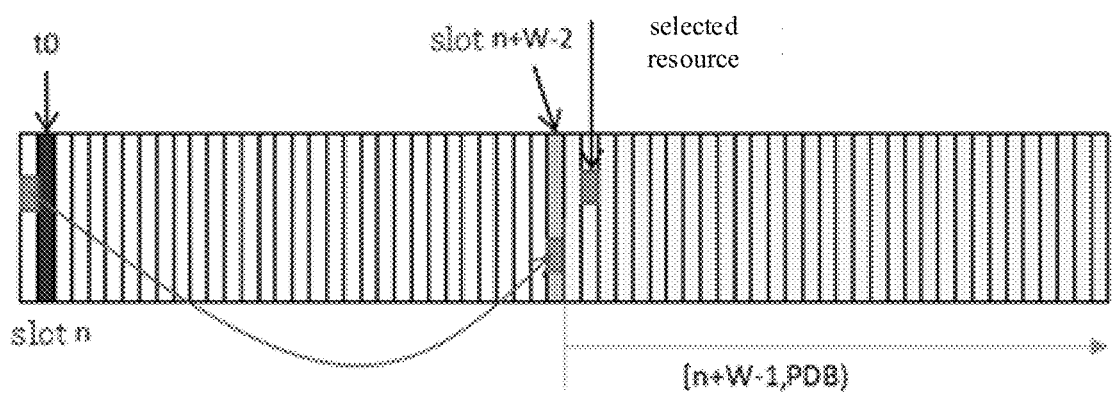
FIG. 4 illustrates a schematic diagram of a principle for determining optional resources, according to another example of the disclosure.

As an example, as illustrated in FIG. 4, the slot is used as the unit of the time unit, and the first duration threshold is W (W≥1, in this example, W=32) slots. For example, each small rectangle represents one time unit. If the resource selection is performed at time to, that is, the moment of selecting a resource is the $n^{th}$ slot (slot n in FIG. 4), for each time unit after slot n, in detail for the (n+W−1)th slot and subsequent time units that satisfy the requirements of the PDB of the data to be transmitted ([n+W−1, PDB) in FIG. 4), since the time interval with slot n is not less than W time units, the sensing condition corresponding to these time units include that the minimum set of time units for sensing before the moment of selecting a resource is an empty set, that is, these time units can be the first time units that satisfy the sensing condition whether to sense on the time unit before the slot n. For each time unit before the (n+W−1)th slot, since the time interval between these time units and slot n is less than W time units, the corresponding sensing condition may include sensing the time unit located before the moment of selecting a resource for not less than the second duration threshold. Therefore, only if the time unit located before the moment of selecting a resource is sensed for not less than the second duration threshold, these time units before the (n+W−1)th slot are the first time units that satisfy the sensing condition.

In an optional embodiment of the disclosure, the method further includes: determining the second duration threshold according to the time interval.

That is, when the foregoing time interval is less than or equal to the first duration threshold, the minimum duration (i.e., the second duration threshold) that needs to be sensed may correspond to the time interval. For example, the larger the time interval, the smaller the second duration threshold. It can be seen from the foregoing description, the second duration threshold can be for each first time unit, or for the set of time units including one or a plurality of first time units (all first time units correspond to the same second duration threshold). As an optional solution, when the set of time units corresponds to the second duration threshold, the second duration threshold can be determined based on the time interval satisfies the condition (such as the minimum) in each time interval between each first time unit in the set of time units and the moment of selecting a resource.

The implementation manner of determining the second duration threshold according to the time interval is not limited in embodiments of the disclosure. For example, it can be determined according to the time interval and a corresponding relationship. The corresponding relationship can be between one or more time intervals (or duration ranges) and the second duration threshold corresponding to each time interval (or duration range). For example, taking the correspondence relationship between duration ranges and second duration thresholds corresponding to duration ranges as an example, for a time unit, after determining the time interval between the time unit and the moment of selecting a resource, the second duration threshold can be determined according to the duration range of the time interval and the corresponding relationship.

Alternatively, the relationship between the time interval and the second time threshold may be that the sum of the time interval and the second threshold is not less than the first time threshold, such as the sum of the two is equal to the first time threshold. That is, the larger the interval, the smaller the second duration threshold.

Figure 5:
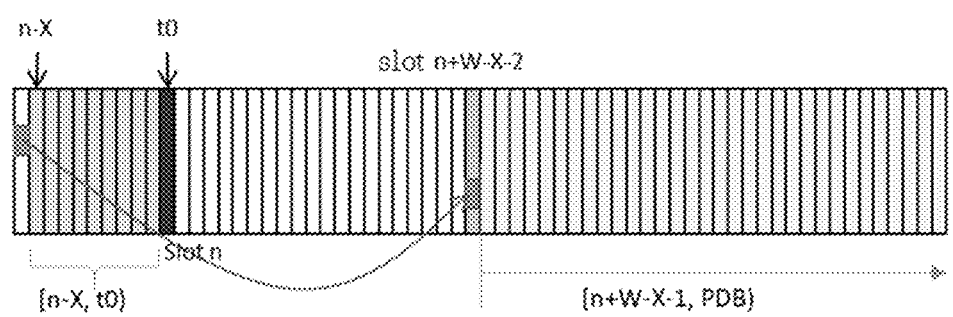
FIG. 5 illustrates a schematic diagram of a principle for determining optional resources, according to still another example of the disclosure.

As an example, as illustrated in FIG. 5, still taking the first duration threshold value of W time units as an example. Assuming that the resource selection is performed at time to, namely slot n. For the time units after time to, if the time interval between the time unit and slot n is less than W time units, the second time interval can be determined according to the time interval and the first duration threshold. Take the (n+W−X−1)th (X>1) time unit as an example, the time interval between it and slot n is W−X time units, and the second duration threshold is the first duration threshold minus the time interval, which is X time units. Therefore, if the user equipment continuously performs sensing X time units before slot n, the $(n+W-X-1)^{th}$ time unit is the time unit that satisfies the sensing conditions, and for the $(n+W-X-2)^{th}$ time unit, if the user equipment continuously performs sensing X time units before slot n, the $(n+W-X-2)^{th}$ time unit is the time unit that does not satisfy the sensing condition. That is, in this example, if the user equipment only continuously senses for X time units before slot n, the time unit located after the $(n+W-X-2)^{th}$ time unit is the second unit that satisfies the sensing condition, namely, each time unit in the time position range of [n+WX−], PDB) in FIG. 5.

In an optional embodiment of the disclosure, the method may further include: in response to a PDB of the data to be transmitted being less than a third duration threshold or being equal to the third duration threshold, determining that the sensing condition includes a minimum set of time units for sensing before the moment being an empty set.

The value of the third duration threshold is not limited in embodiments of the disclosure.

Based on this optional solution, in practical applications, if the PDB of the data to be transmitted is small (that is, less than or equal to the third duration threshold), that is, the data delay requirement is relatively high, at this time, the user equipment at the transmitting end performs channel sensing or not perform channel sensing before selecting a resource. For example, the user equipment may determine whether to sense according to the current status of the equipment.

In an optional embodiment of the disclosure, the method further includes: determining the third duration threshold according to received first indication information; and/or determining the third duration threshold according to a data priority of the data to be transmitted.

The first indication information may be direct indication information or explicit indication information for a duration threshold, such as directly indicating the duration threshold, or implicit indication information, such as an identifier corresponding to the duration threshold (such as an indicator value), such that the user equipment can determine the duration threshold according to the identifier. The first indication information may also be an indication of a mapping relationship. After the user recognizes that the mapping relationship is received, the third duration threshold may be determined based on the mapping relationship. For example, the mapping relationship may be between each index value of a certain parameter or some parameters and the corresponding duration threshold of each index value. The one or some parameters mentioned above may be the equipment parameter(s) of the user equipment, such as the power or available memory of the user equipment, and may also be parameter(s) of the data to be transmitted, such as the data priority of the data to be transmitted.

Optionally, the base station may transmit the first indication information to the user equipment through a high-layer signaling or other manners.

In an optional embodiment of the disclosure, determining the third duration threshold according to the data priority of the data to be transmitted includes: determining the third duration threshold according to the data priority of the data to be transmitted and a first mapping relationship between data priorities and third duration thresholds.

Optionally, the first mapping relationship may be pre-configured, that is, pre-arranged, or transmitted by the base station to the user equipment, and the user equipment may determine the third duration threshold corresponding to the data priority of the data to be transmitted according to the data priority of the data to be transmitted and the mapping relationship.

As another optional manner, the foregoing first mapping relationship may be pre-configured. When the user equipment determines the third duration threshold, if the foregoing first indication information from the base station is received, the user equipment may determine the third duration threshold according to the indication information, or determine the third duration threshold according to the indication information and determine another third duration threshold according to the mapping relationship and the data priority of the data to be transmitted, and determine a larger one of the two duration thresholds or a smaller one of the two duration thresholds as the third duration threshold. If the user equipment does not obtain the first indication information from the base station, the user equipment can determine the third duration threshold according to the pre-configured mapping relationship.

In an optional embodiment of the disclosure, the method further includes: determining a minimum time length for sensing.

In this optional solution, the minimum time length that the user equipment needs to sense the channel can be limited. Based on this solution, it can be stipulated that the user equipment needs to sense a time unit for not less than the minimum time length regardless of determining whether the user equipment needs to sense based on other information before selecting a resource, or the user equipment only senses for the sensing time not less than the minimum time length when it is determined that the sensing will be performed, and does not senses when it is determined that the sensing will not be performed. That is, the minimum time length may only be a limiting condition when the user equipment senses, or a general limiting condition before selecting a resource for the user equipment.

In an optional embodiment of the disclosure, determining the minimum time length for sensing includes: determining the minimum time length according to received second indication information; and/or, determining the minimum time length according to a data priority of the data to be transmitted.

The principle is the same as the first indication information in the foregoing. The second indication information may be indication information for the minimum time length (explicit or implicit indication information), or indication information of a mapping relationship. If it is the indication information of the mapping relationship, for example, the corresponding relationship between data priorities and the time length corresponding to each data priority (it can be a one-to-one relationship or a many-to-one relationship), the user equipment may determine a time length according to the mapping relationship and the index value of one or more parameters corresponding to the equipment, and the time length is the aforementioned minimum time length.

In an optional embodiment of the disclosure, determining the minimum time length according to the data priority of the data to be transmitted includes: determining the minimum time length according to the data priority of the data to be transmitted and a second mapping relationship between data priorities and minimum time lengths.

The second mapping relationship may be received by the user equipment from the base station, for example, the base station transmits it to the user equipment through a high-level signaling, such as, the base station indicates it to the user equipment through a radio resource control (RRC) signaling or other dynamic control signaling, or it may be pre-configured.

Based on this optional solution, different minimum time lengths can be corresponding to data to be transmitted with different priorities. For example, as an optional manner, the higher the priority of the data to be transmitted, the shorter the corresponding minimum time length. For the higher-priority transmission, other sidelink communication user equipment can try to avoid a collision with the higher-priority transmission when selecting a resource, or, when a collision is found, a resource is reselected to avoid the high-priority transmission, so that a relatively short sensing duration is selected: accordingly, for the transmission of data to be transmitted with the lower priority, a relatively long sensing duration is selected to reduce a possibility of collision. As another optional manner, the higher the priority of the data to be transmitted, the corresponding minimum time length may be relatively longer, so that the user equipment may select a resource with a relatively smaller delay when transmitting the high-priority data.

As an optional manner, the second mapping relationship may be pre-configured. At this time, if the user equipment receives the above-mentioned second indication information from the base station, the minimum time length may be determined according to the indication information, or the minimum time length may be determined according to the indication information and another minimum time length may be determined according to the data priority and the second mapping relationship, and a smaller or larger one of the determined two minimum time lengths is selected as the final minimum time length. If the user equipment does not receive the second indication information from the base station, the minimum time length can be determined according to the data priority of the data to be transmitted and the second pre-configured mapping relationship.

In an optional embodiment of the disclosure, the method may further include: in response to determining the data to be transmitted, sensing a channel for transmitting the data to be transmitted.

In other words, the trigger condition for the user equipment to start sensing may be due to the arrival of new data, that is, there is data to be transmitted. When there is no data to be transmitted, channel sensing may not be performed, and when new data needs to be transmitted, and if there are no available resources, the user equipment starts sensing.

Figure 2:
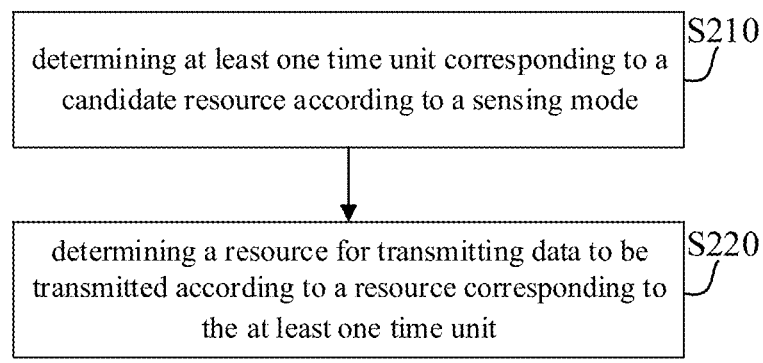
FIG. 2 illustrates a flowchart of a method for selecting a resource in a sidelink communication, according to another optional embodiment of the disclosure.

FIG. 2 illustrates a flowchart of a method for selecting a resource in a sidelink communication, according to some embodiments of the disclosure. The method may be executed by the user equipment at the transmitting end. As illustrated in FIG. 2, the method can include the following.

In step S210, at least one time unit corresponding to a candidate resource is determined according to a sensing mode.

In step S220, a resource for transmitting data to be transmitted is determined according to a resource corresponding to the at least one time unit.

In the sidelink communication, the user equipment (such as the mobile phone) needs to determine the resource(s) that can be used for data transmission before data transmission, that is, the candidate resource(s), and select a resource from the candidate resource(s) randomly or according to certain rules to use in data transmission.

Optionally, since the time position of the time unit where the candidate resource is located should be after the moment of selecting a resource (refer to the description of "moment" in the optional embodiments above), the at least one time unit corresponding to the candidate resource may be determined based on the moment of selecting a resource. For example, if only the PDB of the data to be transmitted can be considered, the resource corresponding to at least one time unit that is located after the moment of selecting a resource and satisfies the data transmission delay requirement at the latest is used as the candidate resource, and the resource used to transmit data is selected from the resources on these time units, that is, the set of time units including these time units can be used as the set of time units where the candidate resources are located, and resources corresponding to the time units in the set can be candidate resources for sidelink transmission.

Figure 3:
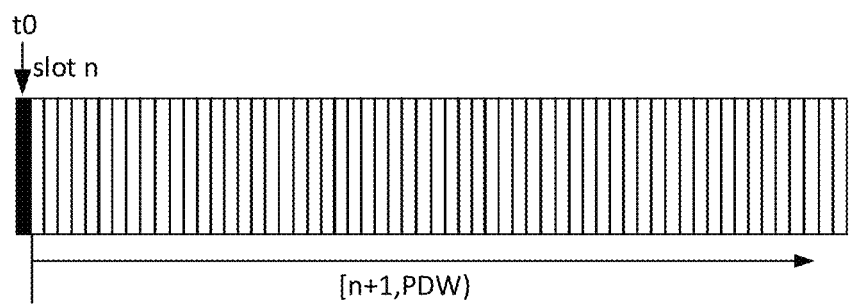
FIG. 3 illustrates a schematic diagram of a principle for determining optional resources, according to an example of the disclosure.

As an example, a slot is the unit of the time unit and the moment of selecting a resource is the time unit of selecting a resource. As illustrated in FIG. 3, a small rectangle corresponds to a slot. It is assumed that the user selects a resource at time to (within the $n^{th}$ slot, that is, slot n in FIG. 3). Optionally, a resource corresponding to each time unit that is located after slot n and satisfies the PDB requirement of the data to be transmitted (that is, which satisfies the PDB after the time to) can be used as a candidate resource, that is, the candidate resources in this example is the resources corresponding to the time units within the range of [n+1, n+1+PDW), where the PDW represents the number of time units corresponding to the PDB of the data to be transmitted.

It should be noted that after the candidate resources are determined, the manner for determining the resource of transmitting the data to be transmitted from the candidate resources is not limited in embodiments of the disclosure. For example, it may be selected randomly from the candidate resources or according to certain rules. For example, the resource selection manner of R16 sidelink can be reused for resource selection.

In an optional embodiment of the disclosure, the sensing mode includes not sensing before selecting a resource or sensing before selecting a resource. In other words, one is the sensing mode and the other is the non-sensing mode. It should be noted that the name of the sensing mode is not limited in embodiments of the disclosure.

Several optional embodiments for determining candidate resources provided by the disclosure will be described below.

In an optional embodiment of the disclosure, in the foregoing step S210, determining the at least one time unit corresponding to the candidate resource according to the sensing mode includes: in response to not sensing before selecting a resource, determining at least one time unit located after a moment of selecting a resource as the at least one time unit corresponding to the candidate resource; and in response to sensing before selecting a resource, determining the at least one time unit corresponding to the candidate resource according to a duration of a time unit for sensing and the moment of selecting a resource.

In other words, in the solution of the disclosure, two modes for determining candidate resources can be provided. One is the candidate resource determination mode in which the user equipment does not perform sensing before selecting a resource, and the other is the candidate resource determination mode in which the user performs sensing before selecting a resource. The embodiments of the disclosure may not limit the sensing mode or the non-sensing mode selected by the user equipment. When the user equipment needs to transmit data, it can determine the sensing mode or the non-sensing mode by itself or according to the indication of the base station. For example, the user equipment can determine the sensing mode or the non-sensing mode according to the current status of the equipment (such as power), the priority of the data to be transmitted, or other factors.

In an optional embodiment of the disclosure, determining the at least one time unit located after the moment of selecting a resource as the at least one time unit corresponding to the candidate resource includes: determining at least one time unit located after the moment of selecting a resource and having a time interval with the moment of selecting a resource not less than a fourth duration threshold as the at least one time unit corresponding to the candidate resource.

For a solution that does not perform sensing, an optional manner can be to directly determine the time unit that satisfies the PDB requirement of the data to be transmitted and is located after the moment of selecting a resource as the time unit where the candidate resource is located, that is, the resource corresponding to the time unit located after the moment of selecting a resource can be used as the candidate resource. At this time, the user equipment does not need to sense, and it can be assumed that all candidate resources are not reserved by other user equipment, so that the resource for sidelink communication data transmission can be directly selected from the candidate resources, such as randomly or according to certain rules. For example, the resource selection manner of R16 sidelink can be reused for resource selection.

In practical applications, for the resources corresponding to the time units after the moment of selecting a resource, other user equipment may reserve resources on these resources. For example, other user equipment may perform non-periodical reservations on these resources. In order to avoid resource collisions with other user equipment as much as possible, as another alternative manner, the time unit having the time interval with the moment of selecting a resource not less than the fourth duration threshold and being located after the moment of selecting a resource is determined as the time unit corresponding to the candidate resource, to reduce or avoid collisions between resources and resources reserved by other user equipment.

The value of the foregoing fourth duration threshold is not limited in embodiments of the disclosure. As an optional manner, for example, in order to avoid collisions between the candidate resources and the resources reserved by other user equipments during aperiodic resource reservations, the duration threshold may be equal to a maximum time interval for resource reservation that is allowed for the user equipment to perform aperiodic resource reservations in the sidelink communication. Take 5G V2x communication as an example. From the above description, it can be seen that when the user equipment performs aperiodic resource reservation, each current transmission can reserve anywhere in the future W time units. That is, when the user equipment selects the resource, the latest time unit that other user equipment can reserve the resource before the moment of selecting a resource is the $(W-1)^{th}$ time unit after the moment of selecting a resource. At this time, the W time units are the maximum time interval that allows aperiodic resource reservation in sidelink communication. For 5G V2x communication, the maximum time interval is 32 slots.

It should be noted that the foregoing fourth duration threshold in embodiments of the disclosure may be the foregoing W time units in 5G V2x communication, or may be other duration threshold agreed by the protocol, or may be determined by the user equipment according to the indication information from the base station. For the convenience of description, the following description of some optional embodiments will take the maximum time interval of W time units as an example.

For this optional solution, the user equipment may not perform sensing before selecting a resource, that is, it can directly select the resource to reduce the energy consumption due to sensing, but it limits the time location corresponding to the resource that the user equipment can select. The user equipment can only select resources after the $(W-1)^{th}$ time unit (based on the time unit of selecting a resource). For example, using the concept of resource selection window, the starting position of the resource selection window is postponed later to at least the $(W-1)^{th}$ time unit, that is, if the user selects a resource in time unit n (the $n^{th}$ time unit), the starting position of the resource selection window is no earlier than the time unit n+W−1 (including the time unit n+W−1).

For example, a slot is the unit of the time unit. As illustrated in FIG. 4, it is assumed that the resource selection is performed by the user equipment at time t0 (in the $n^{th}$ slot, that is, slot n in FIG. 4) and the maximum time interval for aperiodic resource reservation before slot n is W time units (in this example, 32 slots are used). As illustrated in FIG. 4, it is further assumed that other user equipment performs the resource reservation at time t0−1 before time t0 (corresponding to the $(n-1)^{th}$ time unit), the latest time unit that the user equipment can reserve is the $(n+w-2)^{th}$ time unit (slot n+W−2 in FIG. 4). That is, the aperiodic resource reservation before slot n may not reserve the resource corresponding to the time unit after the $(n+w-2)^{th}$ time unit, and if the resource currently selected by the user equipment is located after the $(n+w-2)^{th}$ time unit (including the $(n+w-1)^{th}$ time unit), which can avoid collisions with reserved resources. That is, in this example, resource selection can be made from the resources corresponding to the time units within the range of [n+W−1. PDW] As illustrated in FIG. 4, the resource corresponding to the $(n+W)^{th}$ time unit can be selected (the selected resource in FIG. 4) for data transmission.

For the optional solution of sensing before selecting a resource, the manner of determining the duration of the time unit for sensing before the moment of selecting a resource is not limited in embodiments of the disclosure. For example, the user equipment may determine according to one or more factors such as base station configuration, protocol agreement, or the user equipment's own capabilities. In order to reduce the energy consumption of the user equipment, the duration of the sensing by the user equipment before the moment of selecting a resource can be less than a preset duration, such as less than the maximum time interval allowed for aperiodic resource reservation in sidelink communication, that is, the user may perform sensing for a duration of less than W time units before selecting a resource.

Optionally, determining the foregoing first duration may include: determining the duration of the time unit for sensing according to a minimum time length for sensing.

In other words, the duration of the time unit for sensing should not be less than the minimum time length. For the minimum time length, reference can be made to the description of the minimum time length in the preceding text. For example, the minimum time length may be pre-configured, or may be indicated by the base station through a signaling, such as indicated by the base station through a RRC signaling or other dynamic control signaling, or may be determined based on the priority of the data to be transmitted.

It should be noted that when the user equipment performs sensing according to the minimum time length, it may perform resource sensing with a time length equal to the minimum time length, or may perform resource sensing with a time length greater than the minimum time length. For example, if the minimum time length is 10 time units, the user equipment needs to perform sensing of at least 10 time units before selecting a resource. On the premise that the user equipment performs sensing not less than the minimum time length, how long the user equipment performs sensing is not limited in embodiments of the disclosure. For example, the time length can be determined based on a preset manner, or determined by combining the indication from the base station, or determined in other ways. For example, the user equipment may also determine it according to its own capabilities, the priority of the data to be transmitted, or other factors.

In an optional embodiment of the disclosure, when the sensing is performed before selecting a resource, determining the at least one time unit corresponding to the candidate resource according to the duration of the time unit for sensing and the moment of selecting a resource includes: determining a moment of starting sensing according to the duration of the time unit for sensing and the moment of selecting a resource; and determining at least one time unit located after the moment of starting sensing and having a time interval with the moment of starting sensing not less than a fifth duration threshold as the at least one time unit corresponding to the candidate resource.

The time granularity of the moment of starting sensing and the time granularity of the time unit may be the same or different, and reference may be made to the explanation of the moment of selecting a resource in the foregoing. The value of the fifth duration threshold is not limited in embodiments of the disclosure. For example, it may be the same as or different from the fourth duration threshold described above.

Based on this optional solution of the disclosure, the user equipment can perform sensing for a period of time before selecting a resource, and based on the moment of starting sensing, the time unit located after this time unit and having the time interval with the moment of starting sensing not less than the fifth duration threshold may be determined as the time unit corresponding to the candidate resource. Subsequently, the resource can be selected from the resources corresponding to these time units randomly or according to certain rules, to transmit the data to be transmitted. Compared with the solution in which at least one time unit located after the moment of selecting a resource and having the time interval with the moment of selecting a resource not less than the fourth duration threshold may be determined as the time unit corresponding to the candidate resource without sensing, with this optional solution, the user equipment can select the resource with a smaller delay.

As an optional solution, it is assumed that the user equipment selects a resource in the $n^{th}$ time unit, and starts sensing for continuous X time units before selecting a resource, that is, the moment of starting sensing is the $(n-X)^{th}$ time unit, and the fifth duration threshold is W time units, the user equipment can select a resource located after the $(W-X-2)^{th}$ time unit (take the $n^{th}$ time unit as the starting time unit). For example, using the concepts of a sensing window and a resource selection window, it is assumed that the user selects a resource in time unit n, the sensing window is [n−X, n−Tproc), and the start position of the resource selection window should not be earlier than time unit n+W−X−1 (including time unit n+W−X−1), where Tproc is the necessary processing duration required for the user equipment to obtain the sensing result.

For example, a slot is the unit of the time unit, and Tproc=0. As illustrated in FIG. 5, it is assumed that the user equipment currently selects a resource at time to (in the $n^{th}$ slot, that is, slot n in FIG. 5), and the user equipment senses for X time units before selecting a resource, that is, the user equipment senses within [n−X, n). The user equipment selects a resource at time unit n, and outside the listening window (that is, before the time unit n−X, and the $(n-X-1)^{th}$ time unit in FIG. 5 in this example) the resource may be reserved to the $(n+W-X-2)^{th}$ time unit at the latest, that is, the latest time unit is the $(n+W-X-2)^{th}$ time unit (slot n+W−X−2 in FIG. 5). In this example, the maximum time interval allowed for aperiodic resource reservation in sidelink communication is 32 slots. Take a schematic illustration as an example, that is. W=32. Therefore, setting the starting position of selecting a resource at n+W−X−1 can avoid collisions with the resource reservation outside the listening window. As illustrated in FIG. 5, the range of candidate resources in this example is resources corresponding to each time unit within the time range of [n+W−X−1. PDB), and the resource used for data transmission can be selected from the resources corresponding to these time units, and the selection manner is not limited in embodiments of the disclosure. For example, it can be selected randomly or according to certain rules.

It can be seen that in the above-mentioned optional embodiments provided by the disclosure, the user equipment may not perform sensing before selecting a resource, or may perform sensing for a period of time. Regardless of which manner is selected, compared with the existing solution, the user equipment can reduce the sensing duration, so as to satisfy the energy saving requirements.

In an optional embodiment of the disclosure, the method further includes: in response to determining the data to be transmitted, sensing a channel for transmitting the data to be transmitted.

In other words, the trigger condition for the user equipment to start sensing may be due to the arrival of new data.

In an optional embodiment of the disclosure, the method further includes: in response to a data priority of the data to be transmitted being not less than a preset priority, and/or, in response to a PDB of the data to be transmitted being not greater than a sixth duration threshold, not sensing before selecting a resource or sensing less than a seventh duration threshold before selecting a resource.

That is, for transmissions with higher data priorities or transmissions with higher delay requirements, the user equipment may select not to sense, or sense with a shorter duration (that is, less than the seventh duration threshold).

The value of the sixth duration threshold or the seventh duration threshold described above is not limited in embodiments of the disclosure, and it may be pre-configured, or may be indicated by the base station to the user equipment. Optionally, the determination manner of the sixth duration threshold may refer to the foregoing determination manner of the third duration threshold, that is, any optional manner for determining the third duration threshold described above may be used to determine this duration. For the seventh duration threshold, different seventh duration thresholds can be configured for different types of user equipment. For example, for the user equipment in V2P, a relatively short duration threshold can be configured to save power.

In this optional solution, the lower limit of the data priority of the data to be transmitted may be set to limit the user equipment does not sense or only senses for a short period of time. Only when the priority of the data to be transmitted is not lower than the lower limit (i.e., the set priority), the user equipment may not perform sensing before selecting a resource or perform insufficiently long sensing before selecting a resource. The above-mentioned sixth duration threshold is the requirement that the PDB of the data to be transmitted should satisfy when no sensing is performed or only a relatively short duration of sensing is performed. Only when this requirement is satisfied, the user equipment may not perform sensing or perform sensing based on insufficient duration before selecting a resource. As an alternative, it is assumed that the sixth duration threshold is W+A time units, and A is a positive number not less than zero. The user equipment is allowed only when PDB≤W+A (i.e. W+A time units) not to perform sensing or perform insufficiently long sensing before selecting a resource A can be a predefined value or a pre-configured value. In practical applications, A can be a value greater than 0. This is because when the PDB only slightly exceeds W time units, when using the solution corresponding to the example in FIG. 3 or the solution corresponding to the example in FIG. 4 for resource selection, the number of time units that the user equipment can select may be small, which affects the quality of resource selection.

In the PDB limiting manner, the sixth duration threshold may be a fixed value, or may be different values corresponding to different priorities of the data to be transmitted. For example, a higher priority may correspond to a relatively larger duration threshold, such as the value of A described above with a larger configuration, so as to ensure that the user equipment has relatively more candidate resources.

Optionally, for the solution where the at least one time unit that is after the moment of selecting a resource and has the time interval with the moment of selecting a resource not less than the fourth duration threshold is determined as the time unit corresponding to the candidate resource, the above-mentioned sixth duration threshold is not less than the fourth duration threshold. For the solution where the at least one time unit that is after the moment of starting sensing and has the time interval with the moment of starting sensing not less than the fifth duration threshold is determined as the time unit corresponding to the candidate resource, the sixth duration threshold is not less than the fifth duration threshold.

As shown in the example in FIG. 4, it is assumed that the resource selection is performed at time unit n, and the fourth duration threshold is W time units. The time unit corresponding to the earliest candidate resource, which is located after time unit n and has the time interval with the time unit n not less than the fourth duration threshold, is time unit n+W−2, and the time difference is W−1 time units. Similarly, for the sensing manner, it is assumed that the fifth duration threshold is also W time units. As shown in the example shown in FIG. 5, the time interval between the resource that can be selected and the resource that starts sensing will not be less than W−1 time units. It is assumed that the sensing is triggered by the arrival of data, no matter the time unit that is located after the moment of selecting a resource and has the time interval with the moment of selecting a resource not less than the fourth duration threshold is determined as the time unit corresponding to the candidate resource, or the time unit that is located after the moment of starting sensing and has the time interval with the moment of starting sensing not less than the fifth duration threshold is determined as the time unit corresponding to the candidate resource, the time difference from the arrival of data to the resource selection will not be less than W−1 time units. Both manners need to satisfy that the PDB of the data to be transmitted is not less than W time units, that is, the sixth duration threshold is not less than the fourth duration threshold, or not less than the fifth duration threshold, and the user equipment can have candidate resources to for selecting.

Therefore, for some services with strict delay requirements (for example, PDB<W time units), the user equipment in the foregoing manner may not select an appropriate resource. For the transmission of service data with strict delay requirements, the user equipment can perform the following operations.

The user equipment can select among the candidate resources that satisfy the PDB requirements after the moment of selecting a resource. That is, for the example in FIG. 4, the resource may be selected among resources after the time unit n and before the time unit n+W−1. For the example in FIG. 5, the resource may be selected among resources after the time unit n and before the time unit n+W−X−1. For example, using the concept of resource selection window, if the user equipment selects a resource at time t0, and the sixth duration threshold is W time units, and if PDB<W time units, the user equipment can select among resources after t0+Tproc2 and before t0+PDB, where Tproc2≥0 refers to the necessary processing duration for data transmission after the user selects the resource.

In another alternative, because other user equipment may reserve resources within the time units that satisfy the delay requirements, and if the sensing is not performed before selecting a resource, the selected resource may have a collision with the resource reservation of other user equipment. In this case, when the PDB of the data to be transmitted is less than the sixth duration threshold, the user equipment may also perform a relatively short duration sensing. Optionally, the sensing duration may correspond to the PDB of the data to be transmitted. According to the sensing result, the resource is selected from resources that satisfy the delay requirements to avoid or reduce resource collisions between the selected resources and the reserved resources of other user equipment.

Based on the solutions provided by various optional embodiments of the disclosure, the user equipment can reduce the sensing duration when selecting a resource, and accordingly select a resource after a certain time interval for data transmission, which can effectively reduce the consumption of the sidelink communication user equipment and achieve the effect of energy saving. The solutions are especially suitable for any sidelink communication equipment in the sidelink communication, especially suitable for sidelink communication scenarios with better power saving requirements, such as V2P communication scenarios.

It should be noted that for the solutions provided in the optional embodiments of the disclosure, the implementation principles in different optional embodiments can be cross-referenced.

Figure 6:
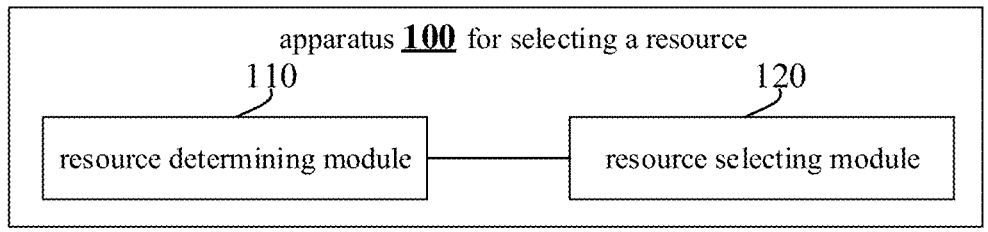
FIG. 6 illustrates a schematic block diagram of an apparatus for selecting a resource in a sidelink communication, according to an optional embodiment of the disclosure.

Based on the same principle as the method corresponding to FIG. 1 provided by the disclosure, some embodiments of the disclosure also provide an apparatus for selecting a resource in a sidelink communication. As illustrated in FIG. 6, the apparatus 100 may include a resource determining module 110 and a resource selecting module 120.

The resource determining module 110 is configured to determine at least one first time unit that satisfies a sensing condition according to a set of time units corresponding to resources for the sidelink communication: in which the set of time units includes one or a plurality of first time units.

The resource selecting module 120 is configured to determine a resource for transmitting data to be transmitted according to a resource corresponding to the at least one first time unit that satisfies the sensing condition.

Optionally, the resource determining module 110 is further configured to: determine the sensing condition according to a time interval between the at least one first time unit and a moment of selecting a resource.

Optionally, the resource determining module 110 is further configured to: in response to a time interval between the at least one first time unit and a moment of selecting a resource being greater than a first duration threshold or being equal to the first duration threshold, determine that the sensing condition includes a minimum set of time units for sensing before the moment being an empty set; and in response to the time interval between the at least one first time unit and the moment of selecting a resource being less than the first duration threshold or being equal to the first duration threshold, determine that the sensing condition includes sensing a time unit located before the moment for not less than a second duration threshold.

Optionally, the resource determining module 110 is further configured to: determine the second duration threshold according to the time interval.

Optionally, the resource determining module 110 is further configured to: in response to a PDB of the data to be transmitted being less than a third duration threshold or being equal to the third duration threshold, determine that the sensing condition includes a minimum set of time units for sensing before the moment being an empty set.

Optionally, the resource determining module 110 is further configured to: determine the third duration threshold according to received first indication information; and/or determine the third duration threshold according to a data priority of the data to be transmitted.

Optionally, when determining the third duration threshold according to the data priority of the data to be transmitted, the resource determining module 110 is configured to: determine the third duration threshold according to the data priority of the data to be transmitted and a first mapping relationship between data priorities and third duration thresholds.

Optionally, the resource determining module 110 is further configured to: determine a minimum time length for sensing.

Optionally, when determining the minimum time length for sensing, the resource determining module 110 is configured to: determine the minimum time length according to received second indication information; and/or, determine the minimum time length according to a data priority of the data to be transmitted.

Optionally, when determining the minimum time length according to the data priority of the data to be transmitted, the resource determining module 110 is configured to: determine the minimum time length according to the data priority of the data to be transmitted and a second mapping relationship between data priorities and minimum time lengths.

Optionally, the resource determining module 110 is further configured to: in response to determining the data to be transmitted, sense a channel for transmitting the data to be transmitted.

Figure 7:
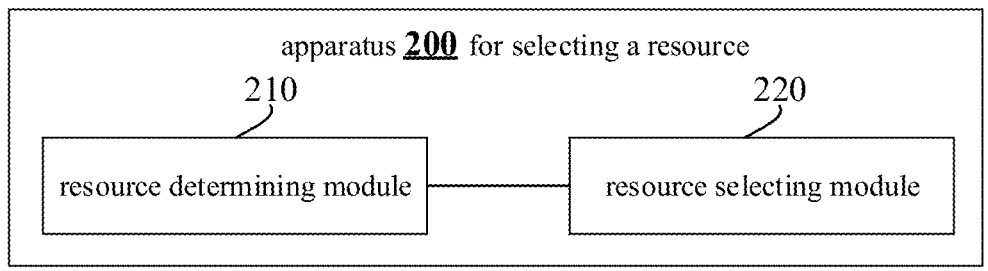
FIG. 7 illustrates a schematic block diagram of an apparatus for selecting a resource in a sidelink communication, according to an optional embodiment of the disclosure.

Based on the same principle as the method corresponding to FIG. 2 provided by the disclosure, some embodiments of the disclosure also provide an apparatus for selecting a resource in a sidelink communication. As illustrated in FIG. 7, the apparatus 200 may include a resource determining module 210 and a resource selecting module 220.

The resource determining module 210 is configured to determine at least one time unit corresponding to a candidate resource according to a sensing mode.

The resource selecting module 220 is configured to determine a resource for transmitting data to be transmitted according to a resource corresponding to the at least one time unit.

Optionally, the sensing mode includes not sensing before selecting a resource or sensing before selecting a resource.

Optionally, the resource determining module 210 is further configured to: in response to not sensing before selecting a resource, determine at least one time unit located after a moment of selecting a resource as the at least one time unit corresponding to the candidate resource; and in response to sensing before selecting a resource, determine the at least one time unit corresponding to the candidate resource according to a duration of a time unit for sensing and the moment of selecting a resource.

Optionally, the resource determining module 210 is further configured to: determine at least one time unit located after the moment of selecting a resource and having a time interval with the moment of selecting a resource not less than a fourth duration threshold as the at least one time unit corresponding to the candidate resource.

Optionally, the resource determining module 210 is further configured to: determine the duration of the time unit for sensing according to a minimum time length for sensing.

Optionally, the resource determining module 210 is further configured to: determine a moment of starting sensing according to the duration of the time unit for sensing and the moment of selecting a resource; and determine at least one time unit located after the moment of starting sensing and having a time interval with the moment of starting sensing not less than a fifth duration threshold as the at least one time unit corresponding to the candidate resource.

Optionally, the resource determining module 210 is further configured to: in response to determining the data to be transmitted, sense a channel for transmitting the data to be transmitted.

Optionally, the resource determining module 210 is further configured to: in response to a data priority of the data to be transmitted being not less than a preset priority, and/or, in response to a PDB of the data to be transmitted being not greater than a sixth duration threshold, not sense before selecting a resource or sense less than a seventh duration threshold before selecting a resource.

It should be noted that, because the apparatuses provided in embodiments of the disclosure can execute the methods provided in embodiments of the disclosure, based on the methods provided in embodiments of the disclosure, those skilled in the art can understand implementations and variations of the apparatuses provided in embodiments of the disclosure. Therefore, how the apparatuses implement the methods in embodiments of the disclosure will not be described in detail herein. As long as those skilled in the art implement the methods in embodiments of the disclosure, all apparatuses are within the scope of the disclosure.

The apparatus provided in embodiments of the disclosure may be implemented as a user equipment. The user equipment includes at least one processor, and the at least one processor may be configured to execute any method provided in the optional embodiments of the disclosure.

Based on the same principle as the method provided in embodiments of the disclosure, embodiments of the disclosure also provide an electronic device. The electronic device includes a memory and a processor, in which the memory is configured to store a computer program, and the processor is configured to execute the computer program stored in the memory to perform the method in any optional embodiment of the disclosure.

Embodiments of the disclosure also provide a computer-readable storage medium, in which a computer program is stored. When the computer program is executed by a processor, the method in any optional embodiment of the disclosure is performed, method.

Figure 8:
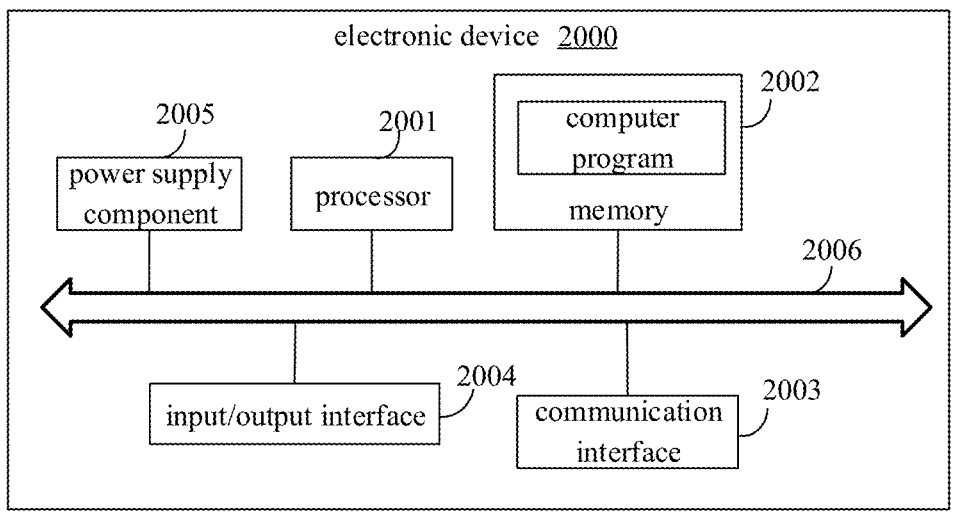
FIG. 8 illustrates a schematic block diagram of an electronic device applicable to some embodiments of the disclosure.

As an example. FIG. 8 illustrates a schematic block diagram of an electronic device applicable to some embodiments of the disclosure. The electronic device may be implemented as a sidelink communication user equipment, such as a smart phone, which may be used to implement the method in any optional embodiment of the disclosure.

As illustrated in FIG. 8, the electronic device 2000 may include components such as at least one processor 2001, a memory 2002, a communication interface 2003, an input/output interface 2004, and a power supply component 2005. Each component can be connected and communicated with each other through a bus 2006.

The power supply component 2005 is configured to provide working power for the electronic device 2000, and the power supply component may include, but is not limited to, a rechargeable battery, a charging interface, a charging protection circuit, and on the like.

The memory 2002 may be configured to store a computer program and the like. The computer program may include program codes or instructions for implementing the methods in embodiments of the disclosure when called by the processor 2001, and may also include a program for implementing other functions or services.

The memory 2002 may be a read only memory (ROM) or other types of static storage devices that can store static information and instructions, a random access memory (RAM) or other types of dynamic storage device can store information and instructions, an electrically erasable programmable read only memory (EEPROM), a compact disc read only memory (CD-ROM) or other optical disk storage, an optical disc storage (including compressed optical disc, laser disc, optical disc, digital universal disc, Blu-ray disc, etc.), a magnetic disk storage medium or other magnetic storage devices, or any other that can be used to carry or store desired program codes in the form of instructions or data structures and that can be accessed by a computer, which is not limited herein.

The processor 2001 is connected to the memory 2002 through the bus 2006, and implements corresponding functions by calling the application programs stored in the memory 2002. The processor 2001 can be a central processing unit (CPU), a general-purpose processor, a data signal processor (DSP), an application specific integrated circuit (ASIC), an field programmable gate array (FPGA) or other programmable logic devices, a transistor logic device, a hardware component or any combination thereof. It can implement or execute various exemplary logical blocks, modules and circuits described in conjunction with the disclosure. The processor 2001 may also be a combination for realizing computing functions, for example, including a combination of one or more microprocessors, a combination of a DSP and a microprocessor, or the like.

The communication interface 2003 can allow the electronic device 2000 to perform wireless or wired communication with other electronic devices to exchange data. For example, the electronic device 2000 transmits the sidelink communication data and receives data (or instructions, etc.) from the base station or other electronic devices through the communication interface. The communication interface 2003 may include, but is not limited to, part or all of a receiver, a transmitter, a wired network interface, a wireless network interface, an antenna, and the like.

The electronic device 2000 can be connected to required input/output devices, such as external storage devices, charging equipment, etc., through the input/output interface 2004, so that the data in the electronic device 2000 can be stored in other storage devices, or the data stored in other storage devices can be stored in the electronic device 2000. It can be understood that the input/output interface 2004 may be a wired interface or a wireless interface. The bus 2006 for connecting various components may include a path for transferring information among the above-mentioned components. The bus 2006 may be a peripheral component interconnect (PCI) bus or an extended industry standard architecture (EISA) bus or the like. According to different functions, the bus 2006 can be divided into an address bus, a data bus, and a control bus.

Optionally, for the solutions provided in embodiments of the disclosure, the memory 2002 may be configured to store application program codes for executing the solutions of the disclosure, and the application program codes are controlled by the processor 2001 for executing. The processor 2001 is configured to execute application program codes stored in the memory 2002 to implement actions of the method or apparatus provided in embodiments of the disclosure.

It should be understood that although the various steps in the flowcharts of the drawings are displayed in sequence as indicated by the arrows, these steps are not necessarily executed in sequence in the orders indicated by the arrows. Unless explicitly stated in this disclosure, there is no strict order for execution of these steps, and they can be executed in other orders. Moreover, at least part of the steps in the flowcharts of the drawings may include multiple sub-steps or multiple stages. These sub-steps or stages are not necessarily executed at the same time, but can be executed at different times. The order of execution of these sub-steps or stages is not necessarily performed sequentially, but may be performed alternately or alternately with at least a part of other steps or sub-steps or stages of other steps.

The above are only part of embodiments of this disclosure. It should be pointed out that for those skilled in the art, certain improvements and embellishments can be made without departing from the principles of this disclosure, and these improvements and embellishments should also be considered as the protection scope of this disclosure.

The invention claimed is:

1. A method for selecting a resource in a sidelink communication, comprising:

determining at least one target time unit that satisfies a sensing condition within a set of time units for sidelink communication resources, wherein the set of time units comprises one or a plurality of target time units;

determining a resource for transmitting data based on a resource in the at least one target time unit;

determining a sensing window according to the at least one target time unit and the sensing condition; and determining a minimum time length for sensing, wherein a starting time unit of the sensing window is separated from a first target time unit by a preset number of time units, and an end time unit of the sensing window is separated from the first target time unit by one or more time units, the preset number being W−1, W=32, wherein determining the minimum time length for sensing comprises at least one of:

determining the minimum time length according to received indication information: or determining the minimum time length according to a data Priority of the data, and wherein determining the minimum time length according to the data Priority of the data comprises:

determining the minimum time length according to the data priority of the data and a second mapping relationship between data priorities and minimum time lengths.

2. The method of claim 1, further comprising:

in response to a time interval between the at least one target time unit and a moment of selecting a resource being less than a first duration threshold or being equal to the first duration threshold, determining that the sensing condition comprises sensing a time unit located before the moment for not less than a second duration threshold.

3. The method of claim 2, further comprising:

determining the second duration threshold according to the time interval.

4. The method of claim 1, further comprising:

in response to a packet delay budget (PDB) of the data being less than a third duration threshold or being equal to the third duration threshold, determining that the sensing condition comprises a minimum set of time units for sensing before the moment being an empty set.

5. The method of claim 4, wherein the received indication information is received second indication information, the method further comprising at least one of:

determining the third duration threshold according to received first indication information; or determining the third duration threshold according to a data priority of the data.

6. The method of claim 5, wherein determining the third duration threshold according to the data priority of the data comprises:

determining the third duration threshold according to the data priority of the data and a first mapping relationship between data priorities and third duration thresholds.

7. The method of claim 1, further comprising:

in response to determining the data, sensing a channel for transmitting the data.

8. An electronic device, comprising:

a memory configured to store a computer program; and a processor configured to, when executing the computer program:

determine at least one target time unit that satisfies a sensing condition within a set of time units for sidelink communication resources, wherein the set of time units comprises one or a plurality of target time units;

determine a resource for transmitting data based on a resource in the at least one target time unit;

determine a sensing window according to the at least one target time unit and the sensing condition; and determine a minimum time length for sensing, wherein a starting time unit of the sensing window is separated from a first target time unit by a preset number of time units, and an end time unit of the sensing window is separated from the first target time unit by one or more time units, the preset number being W−1, W=32, wherein determining the minimum time length for sensing comprises at least one of:
  determining the minimum time length according to received indication information; or
  determining the minimum time length according to a data Priority of the data, and wherein determining the minimum time length according to the data priority of the data comprises:
  determining the minimum time length according to the data Priority of the data and a second mapping relationship between data priorities and minimum time lengths.

9. The electronic device of claim 8, wherein the processor is further configured to:
  in response to a time interval between the at least one target time unit and a moment of selecting a resource being less than a first duration threshold or being equal to the first duration threshold, determine that the sensing condition comprises sensing a time unit located before the moment for not less than a second duration threshold.

10. The electronic device of claim 9, wherein the processor is further configured to:
  determine the second duration threshold according to the time interval.

11. The electronic device of claim 8, wherein the processor is further configured to:
  in response to a packet delay budget (PDB) of the data being less than a third duration threshold or being equal to the third duration threshold, determine that the sensing condition comprises a minimum set of time units for sensing before the moment being an empty set.

12. The electronic device of claim 11, wherein the received indication information is received second indication information, and the processor is further configured to perform at least one of:
  determining the third duration threshold according to received first indication information; or
  determining the third duration threshold according to a data priority of the data.

13. The electronic device of claim 12, wherein in determining the third duration threshold according to the data priority of the data, the processor is further configured to:
  determine the third duration threshold according to the data priority of the data and a first mapping relationship between data priorities and third duration thresholds.

14. A non-transitory computer-readable storage medium having stored therein instructions that, when executed by a processor of an electronic device, cause the electronic device to:
  determine at least one target time unit that satisfies a sensing condition within a set of time units for sidelink communication resources, wherein the set of time units comprises one or a plurality of target time units; and
  determine a resource for transmitting data according to a resource in the at least one target time unit;
  determine a sensing window according to the at least one target time unit and the sensing condition; and
  determine a minimum time length for sensing,
  wherein a starting time unit of the sensing window is separated from a first target time unit by a preset number of time units, and an end time unit of the sensing window is separated from the first target time unit by one or more time units, the preset number being W−1, W=32,
  wherein determining the minimum time length for sensing comprises at least one of:
    determining the minimum time length according to received indication information: or
    determining the minimum time length according to a data Priority of the data, and
  wherein determining the minimum time length according to the data Priority of the data comprises:
    determining the minimum time length according to the data priority of the data and a second mapping relationship between data priorities and minimum time lengths.

* * * * *